United States Patent [19]

Calandro et al.

[11] Patent Number: 5,093,146

[45] Date of Patent: Mar. 3, 1992

[54] PROCESS OF MAKING READY-TO-EAT CEREALS

[75] Inventors: Thomas P. Calandro, Fairfield; Joseph Murray, Wayne, both of N.J.

[73] Assignee: Nabisco Brands, Inc., Parsippany, N.J.

[21] Appl. No.: 597,314

[22] Filed: Oct. 15, 1990

[51] Int. Cl.$^5$ .................... A23L 1/0522; A23L 1/10
[52] U.S. Cl. .................... 426/619; 426/549; 426/551; 426/620; 426/622
[58] Field of Search .................... 426/94, 549, 551, 619, 426/620, 622

[56] References Cited

U.S. PATENT DOCUMENTS

| | | | |
|---|---|---|---|
| 2,954,296 | 9/1960 | Clausi et al. | 99/82 |
| 2,998,318 | 8/1961 | Forkner | 99/86 |
| 3,235,385 | 2/1966 | Cull | 99/1 |
| 3,343,965 | 9/1967 | Gass | 99/92 |
| 3,443,964 | 5/1969 | Marotta et al. | 99/83 |
| 3,505,076 | 4/1970 | Maloney et al. | 99/81 |
| 3,505,078 | 4/1970 | Hreschak | 99/83 |
| 3,508,928 | 4/1970 | Ewing et al. | 99/94 |
| 3,554,763 | 1/1971 | Fast et al. | 99/83 |
| 3,704,134 | 11/1972 | Ronai et al. | 99/83 |
| 3,767,421 | 10/1973 | Gulstad et al. | 426/153 |
| 3,767,422 | 10/1973 | Levitz | 426/152 |
| 3,769,438 | 10/1973 | Rusch et al. | 426/99 |
| 3,849,582 | 11/1974 | Blagdon et al. | 426/152 |
| 3,875,309 | 4/1975 | Johannes | 426/152 |
| 3,887,714 | 6/1975 | Kelly et al. | 426/72 |
| 3,922,370 | 11/1975 | Prakash | 426/559 |
| 3,956,515 | 5/1976 | Moore et al. | 426/549 |
| 4,013,802 | 3/1977 | Reesman | 426/621 |
| 4,350,714 | 9/1982 | Duvall | 426/559 |
| 4,451,491 | 5/1984 | Trop et al. | 426/555 |
| 4,465,702 | 8/1984 | Eastman et al. | 426/578 |
| 4,472,449 | 9/1984 | Quinn et al. | 426/621 |
| 4,478,857 | 10/1984 | Strauss | 426/72 |
| 4,526,800 | 7/1985 | Howard | 426/559 |
| 4,588,596 | 5/1986 | Bone et al. | 426/290 |
| 4,623,548 | 11/1986 | Willard | 426/559 |
| 4,688,519 | 5/1987 | Dartey et al. | 426/548 |
| 4,806,377 | 2/1989 | Ellis et al. | 426/549 |
| 4,873,098 | 10/1989 | Banks et al. | 426/94 |
| 4,885,180 | 12/1989 | Cochran et al. | 426/241 |

FOREIGN PATENT DOCUMENTS 0252270 5/1987 European Pat. Off. .
2100111A 12/1982 United Kingdom .

OTHER PUBLICATIONS

Tehcnical Service Bulletin No. 29387-260 for Baka-Snack TM.
Bulletin No. 113 of National Starch and Chemical Corp. for Film-Set(TM).

Primary Examiner—Donald E. Czaja
Assistant Examiner—Helen Pratt

[57] ABSTRACT

A ready-to-eat cereal is prepared from a cookie formulation, including flour, sugar, shortening or fat and a bowl-life extender. The bowl-life extender includes a waxy starch, preferably a pregelatinized starch from waxy maize in an effective amount to improve the bowl life of the cereal pieces without causing the cereal pieces to become excessively firm. A cold water swelling granular starch is also included with the pregelatinized waxy starch to improve bowl life of the cereal. The dough is prepared by mixing the ingredients to form a cookie dough-like consistency. The dough may be rotary molded or sheeted and cut into bite-size pieces and baked to leaven the cereal pieces. The baked pieces may then be coated with an optional sugar glaze.

39 Claims, No Drawings

PROCESS OF MAKING READY-TO-EAT CEREALS

FIELD OF THE INVENTION

The present invention is directed to a ready-to-eat breakfast cereal and to a method of producing the cereal. The invention is further directed to a method of extending the bowl life of a breakfast cereal prepared from a cookie dough formulation.

BACKGROUND OF THE INVENTION

Breakfast cereals and snacks are generally prepared by forming a dough from flour and water, cooking the dough and shaping the cooked dough into pieces by extruding, cutting or flaking. Generally, expanded or puffed cereals have little or no added fat and are not chemically leavened. Puffed or expanded cereals generally have a low density and are very porous due to the cell structure formed by flashing off moisture at the extruder die. The porous characteristic of puffed cereals results in a cereal which readily absorbs liquids and quickly becomes soggy in milk. Flaked cereals, such as corn flakes, are generally of higher density than puffed cereals. These flaked cereals similarly tend to have a relatively short bowl life and become soggy within a few minutes after immersing in milk. The tendency of conventional cereal formulations to become soggy very quickly when immersed in milk has typically resulted in limited consumer appeal of the products and encouraged efforts to find suitable methods of extending the bowl life of ready-to-eat cereals.

Conventional cookie formulations become soggy very quickly when immersed in milk and tend to disintegrate completely. Generally, expanded or puffed cereals become soggy in milk in a few minutes but still retain some structural integrity such that the cereal pieces do not completely disintegrate. In contrast, cookie formulations absorb milk quickly and disintegrate.

Conventional cookie production generally involves preparing a farinaceous dough having a high fat or shortening content. The water content is usually rather low compared to conventional cereal compositions for producing breakfast cereals. The amount of water added to cookie doughs is usually only that amount needed to make the dough machinable by commercial machines. The high fat content and the leavening of the cookie dough may contribute to the crumb-like structure, texture and flavor of cookies. The high fat or shortening content of cookies is one characteristic which distinguishes cookies from crackers and expanded or puffed starch-based products.

Although the reasons are not completely understood, the high fat content of the cookie formulation tends to correlate to the short bowl life and short disintegration time of cookies when immersed in milk. The short bowl life of cookies may be due in part to the leavened crumb-structure of cookies which absorb milk faster than the expanded cellular structure of puffed cereals. It has generally been observed that as the fat content increases in the cookie formulation, the disintegration time of the baked cookie decreases. This characteristic has limited the successful use of cookie formulations in producing a ready-to-eat breakfast cereal which has an acceptable texture and bowl life in milk.

Efforts to improve the bowl life of breakfast cereals prepared from extruded and expanded cereal doughs and from baked cookie formulations have generally experienced only moderate success. In many instances the bowl life of expanded cereals is enhanced by providing a heavy sugar coating on the cereal pieces followed by a coating of a vegetable gum. Other methods to extend bowl life include providing a coating of fat or oil on the cereal. In addition to fats and oils, other hydrophobic components, such as waxy materials, have been used as coatings or additives in attempting to extend bowl life.

One method of extending the bowl life of cereals and snack foods is disclosed in U.S. Pat. No. 3,769,438. The disclosed method applies a coating of a bowl-life-extending syrup on conventionally prepared ready-to-eat breakfast cereals, such as puffed wheat, puffed rice and puffed corn. The syrup is prepared by initially forming a heated aqueous solution of a hexitol, such as sorbitol or mannitol. A fat or oil is then added to the heated syrup and dispersed homogeneously. The ratio of hexitol to fat is disclosed to be 0.03:2.

In the method disclosed in U.S. Pat. No. 3,769,438 emulsifiers are included in the syrup to disperse the fat or oil. The aqueous solution is heated to 180.F before adding fat. The cereal is coated by adding the puffed cereal to a tumbling coating pan and slowly adding the hot syrup to the tumbling cereal. The composition of the coating on the finished cereal product is reported to be made up of 0.5% to 15% hexitol, 5% to 20% fat, with the remainder being made up of sweeteners, flavors, salt and seasonings.

Another example of an effort to improve bowl life is disclosed in U.S. Pat. No. 4,588,596. A ready-to-eat cereal is disclosed as being produced from a cookie dough which is formed into bite size pieces. The disclosed cookie formulation includes at least 40% of flour or other cereal grain, 3% to 17% fat, and 20% to 50% sugar. The bowl life of cereals prepared from the cookie formulation are reported to be improved by incorporating a waxy material from a metallic fatty acid salt, such as zinc stearate. The fatty acid salt is reportedly effective when incorporated into the cookie formulation or when applied as a coating. When used as a coating, the cereal pieces are warmed and dusted with a powder of the fatty acid salt. The coated cereal pieces are then placed in an oven to melt the coating and then redusted and heated a second time. The metallic fatty acid salt is reported to provide a bowl life of 4 minutes or more.

U.S. Pat. No. 4,350,714 relates to a method of producing an expanded cereal containing high levels of corn bran which reportedly has an enhanced bowl life. The ingredients are prepared in a cooker-extruder under high pressure and temperature. The cooked cereal composition is extruded under high pressure to form an expanded product. It is reported that corn bran ground to a fineness of 40 mesh or finer prevents extruder surging and results in improved bowl life characteristics compared to commercially prepared ready-to-eat cereals containing wheat bran. The primary starch-containing ingredient includes oats, corn, wheat flour, rice, sorghum, soya, tapioca, waxy maize and other cooked cereal grains.

Another method of producing a puffed cereal product is disclosed in U.S. Pat. No. 2,954,296. This method produces an expanded, puffed cereal by adding ingredients to a cooker extruder and extruding under elevated pressure and temperature. The method includes combining small percentages of pregelatinized starch-containing materials along with the uncooked farinaceous material. The use of the pregelatinized starch-containing materials is reported to provide adequate elasticity to the dough such that adequate expansion takes place at the puffing pressures. The expanded product is reported to have a more uniform vesicular internal structure and a comparatively softer external shell. The strength of the cell walls and the size and distribution of the cell wall cavities are said to produce a product having a high resistance to chewing and which will not decompose on hydration in milk to a mushy condition. The pregelatinized starch is disclosed as being starch from any cereal or fiber. The disclosed starches include pregelatinized corn, waxy maize, tapioca and potato.

In the process of the present invention, ready-to-eat cereals are produced by forming a cookie dough and shaping the dough into bite size pieces and baking the pieces. The cookie dough used to produce the ready-to-eat cereal includes an effective amount of one or more starch-based bowl life extenders to provide an improved bowl life to the baked cereal pieces.

SUMMARY OF THE INVENTION

The present invention is directed to a ready-to-eat breakfast cereal and to a method of preparing the cereal. More specifically, the invention is directed to a ready-to-eat cereal prepared from a cookie formulation which exhibits an improved bowl life when the cereal is immersed in milk.

The breakfast cereal according to the invention is prepared from a cookie-like formulation containing flour, fat or shortening, and sugar. To improve the bowl life of the finished cereal, an effective amount of a mixture of at least one pregelatinized waxy starch and at least one cold water swelling starch are included in the formulation.

In embodiments of the invention, the cookie formulation is initially prepared by creaming a sugar component, dough conditioner, emulsifier and a portion of the flour with a fat or shortening. Water and an optional liquid sweetener, such as honey or high fructose corn syrup, are added and blended with the ingredients to form a homogeneous mixture. A remaining portion of the flour, leavening agent and the starch bowl life extenders are then added and uniformly blended with the other ingredients to form a cookie dough. The cookie dough may be allowed to set for a sufficient period of time under controlled conditions to proof the dough and develop the proper texture for shaping and machining. The cookie dough is then shaped into pieces and baked in an oven to produce a leavened ready-to-eat cereal.

The cookie dough is preferably shaped into pieces by rotary molding. In an alternative embodiment, the dough may be sheeted and cut using a rotary cutter. Other methods of forming and shaping the doug into pieces may include, for example, stamping, extruding and the like.

In the present invention the bowl life extender comprises at least one pregelatinized or modified waxy starch from waxy maize, sorghum or rice. The bowl life extender, in addition to the waxy starch, includes at least one cold water swelling, gel forming granular starch. The use of a bowl life extender which is a mixture of a pregelatinized waxy starch and a cold water swelling starch provides an unexpectedly longer bowl life than the use of either component alone. The waxy starch when used alone is able to produce a cereal product having a bowl life of up to about 10 minutes. A mixture of a pregelatinized waxy starch and a cold water swelling starch produce a product having a bowl life of up to about 20 minutes. The pregelatinized waxy starch may be included in the cookie formulation in an amount of about 0.75% by weight to about 10.0% and preferably from about 1.25% by weight to about 5.0% by weight, based on the total weight of the cookie formulation. The cold water swelling granular starch may be included in an amount of about 0.5% to about 5.0% by weight of the dough, and preferably about 1.5% to about 2.0%.

The cookie dough contains at least one flour component in the amount of about 30% to about 50% by weight of the dough and preferably about 35% to about 45% by weight of the dough. In a preferred embodiment of the invention, the cookie dough contains about 10% to about 25% graham flour based on the total weight of the dough. The dough further includes at least one fat or shortening in the amount of about 5% to about 25% by weight of the dough and preferably about 8% to about 15%.

Process compatible ingredients can be included to adjust the texture of the product produced by the process of the present invention. For example, at least one solid, crystalline, or granulated sugar, such as sucrose, may be used in the cookie formulation. In addition to solid or granulated sugars, liquid sweeteners may also be used, such as, for example, liquid brown sugar, high fructose corn syrup and honey. In embodiments of the invention, the sugar component may be added in an amount to provide, for example, from about 10% by weight to about 40% by weight, and preferably from about 15% to 30% by weight total sugar solids, based on the total weight of the cookie formulation. Crystalline or granulated sucrose used alone or used with liquid sweeteners is preferred.

The cookie formulation of the present invention preferably contains sufficient water to obtain a texture or consistency suitable for sheeting, cutting and stamping into pieces of a desired size. Generally, the total water content ranges from about 10% to about 20% by weight and preferably about 12% to about 18%. In the preferred embodiment of the invention the cookie formulation contains sufficient water to provide a consistency for cutting the dough into pieces by rotary molding processes.

An optional dough conditioner, such as sodium stearoyl lactylate, may be added to enhance machinability of the dough. The dough conditioner has been found to be desirable as the amount of the bowl life extender is increased. Suitable amounts of the dough conditioner are from about 0.05% to about 0.25% by weight of the flour component and preferably about 0.15% to about 0.20% by weight. In a preferred embodiment of the invention, the cookie dough includes a mixture of sodium stearoyl lactylate in the amount of about 0.05% to about 0.25% by weight and lecithin in the amount of about 0.05% to about 0.25% by weight based on the total weight of the dough.

The cereal formulation may further contain flavorings such as powdered cocoa, chocolate liquor, vanilla extracts, almond extract, fruit flavors, spices such as cinnamon and nutmeg, and other flavoring agents. The amount of the flavoring added is determined by the intensity of the flavoring agent and the desired intensity of the flavor. Generally, the amount of flavoring included in the formulation is less than about 15% and preferably about 1% to about 5% by weight.

The cookie formulation may be formed and shaped into pieces and baked in a convection oven. In the preferred embodiment of the invention, the oven is a multizone-heated continuous oven. The baked pieces exit the oven in a fully leavened, baked form as a crisp, cookie-like breakfast cereal. An optional confectionery glaze may be sprayed onto the pieces as they exit the oven. The glaze may comprise an aqueous sugar solution having sufficient sugar concentration to form a glossy appearance on the surface of the pieces.

The method according to the present invention produces a ready-to-eat breakfast cereal having a sweet taste and which remains crispy in milk for an extended period of time. In embodiments of the present invention, the breakfast cereal provides sufficient sweetness while using less sugar or other sweeteners compared to the usual methods of preparing presweetened breakfast cereals. The cereal according to the invention further provides a distinctive graham flavor without the short bowl life generally inherent in graham cracker formulations.

DETAILED DESCRIPTION OF THE INVENTION

In the present invention a cookie-like formulation is baked to produce a ready-to-eat cereal which exhibits an improved bowl life when immersed in milk. The cereal may be prepared by forming a cookie dough containing at least one bowl-life extender, forming the dough into pieces and baking the dough pieces to a leavened, crisp texture and low moisture content. The cookie dough pieces are preferably baked in an oven to leaven the cookies and to produce a leavened cookie-like crumb structure. The resulting cereal pieces have a sufficiently low moisture to be shelf stable.

In embodiments of the invention, a cookie dough formulation is prepared by first creaming sugar and a portion of the flour with the fat or shortening, a dough conditioner and an optional emulsifier. Liquid components, such as liquid sweeteners, flavors and water, are then blended into the creamed ingredients. All the remaining dry ingredients, such as any remaining flour, leavening agents and the bowl-life extending ingredients are blended to form a homogeneous dough. The dough is allowed to stand and proof for a period of time to develop proper texture. The cookie dough is then shaped into predetermined size pieces and baked. The baked pieces generally have a final moisture content of about 2% to about 5% by weight. An optional sugar glaze may be applied to the baked pieces to provide added sweetness and a glossy appearance.

The flour component may be derived from any cereal grain or mixture thereof. Exemplary of the flour components which may be used are wheat flour, corn flour, oat flour, barley flour, rye flour, rice flour, and mixtures thereof. The flour may be bleached or unbleached. Wheat flour, and in particular whole wheat flour and/or graham flour, and mixtures of wheat flour with other grain flours are generally preferred. The flour component in the preferred embodiment contains sufficient graham flour to produce a distinctive graham flavor to the cereal. The flour component is generally used in the amount of about 30% by weight to about 50% by weight and preferably about 35% to about 45% by weight. In a preferred embodiment, the flour component is a blend of wheat flour and graham flour, where the graham flour is included in the amount of about 10% to about 25% by weight of the dough.

In addition to the flour component, optional bulking agents may be included to provide added fiber, and/or reduce the caloric value of the finished cereal product. The bulking agent may be used as a replacement for all or a portion of the flour. Bulking agents which may be used include, for example, polydextrose, hollocellulose, microcrystalline cellulose, and mixtures thereof. Generally, when a bulking agent is used, the bulking agent is blended with a flour in amounts of up to about 20% by weight based upon the weight of the dough. Corn bran, wheat bran, oat bran, rice bran, and mixtures thereof may be used to replace the flour in whole or in part to produce a fiber-enriched product, to enhance color, or to affect texture. The bran may be included, for example, in amounts of up to about 20% by weight, based upon the weight of the dough. Generally the bran component will be included in amounts of about 1% to about 10% by weight, and preferably from about 2% to about 5% by weight, based upon the weight of the dough.

The fat or shortening which may be used in the present invention may be any food grade fat or shortening suitable for baking applications. The fats which may be used generally include vegetable fats, lard, tallow and mixtures thereof. The fat may be fractionated, partially hydrogenated, and/or interesterified. Edible reduced- or low-calorie, or non-digestible fats, fat substitutes, or synthetic fats, such as sucrose polyesters which are process compatible, may also be used. The shortenings or fats may be solid or semi-solid at room temperature of about 75.F to about 90.F. The use of fats which are solid or semi-solid at room temperature is generally preferred over liquid oils to reduce oil separation from the finished product during storage.

The fat or shortening is generally included in amounts of about 5% to about 25% by weight, based on the total weight of the ingredients. Preferably, the fat or shortening is included in amounts of about 8% to about 15% by weight.

Exemplary emulsifiers which can be used include lecithin, sorbitan monostearate, mono- and/or di-glycerides and polyoxyethylene sorbitan fatty acid esters, such as polysorbates (e.g., polyoxyethylene (20) sorbitan monostearate). A preferred emulsifier used as a dough conditioner is sodium stearoyl o lactylate sold under the name Emplex® by America Ingredients Company. Exemplary amounts are up to about 3% by weight of one or more emulsifiers based upon the weight of the flour. In the preferred embodiment the emulsifier is included in the amount of about 0.05% to 0.25% by weight of the dough Emulsifiers are often added to cookie doughs to enhance the formation of the emulsion with the fat component and to reduce the amount of mixing required. Generally emulsifiers are included in cookie doughs to reduce the amount of work needed to form the emulsion.

The ready-to-eat cereal of the present invention may also contain process-compatible ingredients to modify the texture of the products, such as sucrose, fructose, lactose, dextrose, galactose, maltodextrins, corn syrup solids, hydrogenated starch hydrolysates, protein hydrolysates and mixtures thereof. Reducing sugars, such as fructose, maltose, lactose, and dextrose or mixtures of reducing sugars may be used to promote browning during the baking stage. Fructose is the preferred reducing sugar, because of its ready availability and its generally more enhanced browning effect. The source of fructose may include invert syrup, corn syrup, high fructose corn syrup, molasses, brown sugar, maple syrup and mixtures thereof. The sugar may be admixed with other ingredients in either solid form or crystalline form.

Crystalline or granulated sucrose alone or with other sugars is preferred in the present invention. The sucrose content may, for example, be at least about 80% by weight, based upon the total sugar solids content of the dough. The balance of the sugar solids may comprise, for example fructose, dextrose, lactose, or mixtures thereof. Sugar granulations which may be used range, for example, from about 4X to about 12X.

In embodiments of the present invention, the total sugar solids content of the cookie formulation of the present invention is, for example, at least about 10% by weight, and may, for example, go up to about 40% by weight, based upon the total weight of the cookie dough. The sugar solids content preferably ranges from about 15% by weight to about 30% by weight, based upon the weight of the cookie dough.

The total moisture content of the cookie formulation is generally in the range of about 10% to about 20% by weight. The preferred moisture content is from about 12% to about 18% by weight. The amount of added water is generally in the amount of about 2% to 15% by weight. The amount of moisture in the cookie formulation should be sufficient to provide the desired consistency to enable proper forming and shaping, machining, and cutting of the dough. The total moisture content of the dough will include any water added as a separate ingredient, as well as the moisture from the flour, which is usually 12% to 14% by weight of the flour and the moisture from other ingredients, including, for example, high fructose corn syrups, honey, invert syrups, or liquid humectants. Generally, the amount of water present in the cookie formulation is sufficient to produce a consistency which can be sheeted and shaped using conventional cutting apparatus or rotary molding apparatus. If the water content is too low, the dough may be too stiff and cannot be machined. The addition of too much water may cause the dough to become sticky and too soft to hold its shape. The total moisture content is preferably sufficiently low to prevent any substantial gelatinization of the starch in the flours during baking.

The bowl life extenders are preferably starches which form a substantially continuous film on the surface of the cereal piece during baking. Suitable bowl-life extending starches include starches and modified or pregelatinized waxy starches such as those from waxy maize, sorghum, rice and mixtures thereof. One form of pregelatinized starch which can be used as a bowl-life extender is a modified pregelatinized starch from waxy maize and sold under the name of "Baka-Snack" ® by National Starch and Chemical Company of Bridgewater, New Jersey. Another bowl-life extender which may be used is a cold water swelling starch sold under the name Mira-Gel ® by A. E. Staley Manufacturing Division of Staley Continental, Inc. The cold water swelling starch preferably has a cold water solubility of at least about 50%.

In a preferred embodiment of the invention, the bowl-life extender is a mixture of at least one modified or pregelatinized waxy starch and at least one cold water swelling granular starch. The bowl- o life extender may be included in the dough in an amount such that the final dough composition contains from about 0.75% to about 10%, preferably about 1.25% to about 5.0% of a modified or pregelatinized waxy starch and about 0.5% to about 5.0%, preferably 1.5% to about 2.0% cold water swelling granular starch, wherein the percentages are based on the total weight of the dough formulation.

Although the mechanism of the bowl-life-extending effect of the starches is not completely understood, it is believed that the bowl-life extender produces a substantially continuous film on the outer surface of the cookie piece during baking. It is believed that the continuous film is formed by the modified or pregelatinized waxy starch. The modified starches are believed to alter the entire starch system such that it binds up water, thereby inhibiting penetration of the milk into the cereal pieces. This film may act as a moisture resistant barrier to resist the migration of moisture from the surroundings to the interior of the cereal piece and thereby inhibit sogginess and enhance bowl life. It has been found that cereal pieces which remain whole and intact experience a longer bowl life compared to broken pieces. This characteristic tends to support the proposition that the bowl-life extender forms a substantially continuous film on the outer surface of the cereal piece during baking. It has also been found that not all starches will form the moisture-inhibiting barrier on the surface thereof. For example, wheat starch which had been pregelatinized did not demonstrate any significant bowl-life-extending effect.

The production of cold water soluble granular starch materials which may be used in the practice of the invention is described in U.S. Pat. No. 4,465,702 to Eastman et al., which patent is herein incorporated by reference in its entirety. According to U.S. Pat. No. 4,465,702, the cold-water swelling/cold-water soluble starch materials are prepared by forming a slurry of granular ungelatinized corn starch in a liquid medium comprised of water and either ethanol, denatured ethanol, propanol or isopropanol, and heating the slurry to a temperature of about 300° F. to about 360° F. at or above autogenic pressure for about 1 to about 30 minutes. The cold-water-swelling granular starch material is then separated from the processing medium by filtration, centrifugation, decantation and like means.

According to the patent, the cold-water swelling/cold-water soluble starch material derived from ungelatinized corn starch consists essentially of substantially intact, partially swollen granules which appear nonbirefringent when viewed under a polarizing microscope and which have a cold water solubility of at least 50% and a reduced native fat content of about 0.25% or less. The ungelatinized corn starch starting material can be either chemically unmodified i.e. not reacted with chemical modifiers, or modified chemically by reaction with various amounts of starch reactive chemical reagents such as oxidants, acids, etherifying agents and esterifying agents. The cold-gelling characteristic (i.e. the ability to set to a sliceable gel) of the granular starch materials, it is disclosed, is most prominent where the granular starch starting material has been subject to little or no chemical modification.

A cold water swelling, granular starch for use in the present invention which is commercially available is sold under the name "MIRA-GEL 463 Starch" and is manufactured by the A. E. Staley Manufacturing Company, Decatur, Ill. This starch is derived from corn starch. Unlike a typical pregelatinized starch which microscopically reveals particles that are swollen, fragmented and generally flake-like in shape, MIRA-GEL 463 particles appear as whole, regular granules. It thickens and sets to a gel quickly using room temperature water. Setting of the gel typically occurs in half an hour at room temperatures and the gel strength exceeds that of conventional, cooked, common corn starches. The MIRA-GEL 463 starch has the ability to gelatinize and set in a low moisture media such as corn syrup (20% moisture) with no more than atmospheric cooking (less than or equal to 212.F). Gels made with the starch will not melt or flow when exposed to high heat. They are heat stable, retaining form and firmness, even when held at oven temperatures of 350.F. Typically, the MIRA-GEL 463 starch is a white powder having a moisture content of about 5%, a pH of about 5.5, an ash content of about 0.1%, a gel strength of at least 90 grams as measured on a Voland Stevens LFRA Texture Analyzer, and a cold water solubles content of at least 70% by weight. A typical screen analysis for the product is: (a) 0.1% maximum on a U.S. #30 mesh, and (b) 95.0% minimum through a U.S. #100 mesh.

The bowl-life-extending starches are included in the cookie formulation in an effective amount to form a sufficient film o the surface of the cereal piece after baking. It has been found that a cold water swelling granular starch when used alone without a pregelatinized waxy starch has not been effective in enhancing bowl life. The cold water swelling starch is believed to have a synergistic effect with the modified or pregelatinized waxy starches to extend and enhance bowl life compared to either component when used alone. The waxy starch bowl-life extender is added in the amount of about 0.75% to about 10.0% by weight and preferably from about 1.25% to about 5.0% by weight, based on the weight of the cookie formulation. The cold water swelling granular starch may be included in the amount of about 0.5% to about 5.0% by weight and preferably about 1.5% to about 2.0% by weight based on the dough. The amount of the starch bowl life extender is important in sufficiently enhancing the bowl life and in affecting the texture of the finished cereal piece. For example, it has been found that amounts of the waxy starch bowl life extender above about 10.0% by weight imparts an unpleasant and slimy mouth feel to the cereal pieces. Alternatively, amounts below about 0.75% by weight do not appreciably improve the bowl life of the cereal pieces.

The bowl life of the resulting cereal may vary depending on the dough formulation, the amount of the bowl life extender and the type of bowl life extender. The bowl life of the freshly baked cereal piece as it exits the oven is relatively short, generally about 3 minutes. As the moisture of the baked pieces equilibrates and the pieces stabilize over a period of days to a week, the bowl life increases. For example, the bowl life of a cereal containing a pregelatinized waxy starch exhibits a bowl life of up to about 9 minutes after about one week from baking. A cereal containing a mixture of pregelatinized waxy starch and a cold water swelling starch after about 1 week from baking exhibits a bowl life of up to about 20 minutes for formulations containing honey or cinnamon flavoring. Chocolate flavored cereal pieces exhibit a bowl life of about 9 to 12 minutes. In a preferred embodiment of the invention the resulting cereal has a bowl life of about 10 minutes to about 20 minutes.

In a preferred form of the invention a dough conditioner is added to the dough formulation to aid in the dispersion of the bowl life extender and to improve machinability of the dough. It has been found that the addition of a dough conditioner enables the addition of larger amounts of the bowl-life extenders and particularly the cold water swelling granular starches without adversely influencing the machining characteristics of the dough. In practice it has been found that the use of a cold water swelling starch with the waxy starch as a bowl-life extender produces a dough which can be machined if used in a short period of time. After about 5 minutes, the cold water swelling starch tends to cause the dough to become too stiff, dry and crumbly to be machined using conventional apparatus. The addition of the dough conditioner results in a dough having a consistency which is suitable for machining for extended periods of time.

Sodium stearoyl lactylate is particularly suitable as a dough conditioner to produce a machinable dough and to produce a dough which contains a bowl life extender and which will retain its machineable consistency for extended periods of time. The sodium stearoyl lactylate has been found to be most effective as a dough conditioner when used in combination with another emulsifier, and in particular lecithin. Lecithin when used alone is not suitable as a dough conditioner and does not sufficiently extend the machining time of the dough. A mixture of lecithin and sodium stearoyl lactylate has been found to provide a synergistic effect in prolonging the machinable consistency of the dough compared with the use of lecithin or sodium stearoyl lactylate alone. The sodium stearoyl lactylate is generally included in the dough in the amount of about 0.05% to about 0.25% by weight and preferably about 0.15% to about 0.20% by weight based on the total weight of the dough. Lecithin may be included in amounts of about 0.05% to about 0.25% by weight of the dough. In a preferred embodiment of the invention, the dough containing a mixture of a waxy maize and a cold water swelling of sodium stearoyl lactylate and lecithin as a dough conditioner and emulsifying system.

The formulation of the present invention may contain up to about 5.0% by weight of a leavening system, based on the total weight of the formulation. The amount of the leavening agent used is selected to control the rise and spread of the dough and to adjust the pH of the finished cereal. Exemplary chemical leavening agents include sodium bicarbonate, ammonium bicarbonate, sodium phosphate, tartaric acid and mixtures thereof. In the preferred embodiments of the invention, the leavening agent is provided in amounts of about 1.0% to about 2.0% by weight based on the weight of the dough.

In embodiments of the invention, a dry multi-vitamin premix may be included in the cereal formulation. Dry vitamin compositions are preferred to avoid the addition of the carrier liquid to the cereal formulation. Dry multi-vitamin premixes suitable for the invention may, for example, be such as those supplied by Hoffman LaRoche Company. The usual practice is to add a vitamin concentration of 2 to 4 times the USDA recommended daily allowance to ensure that sufficient vitamin concentrations remain after processing and storage. In one form of the invention, the vitamin premix is dry blended with the sugar component before admixing with the remaining ingredients.

A vitamin premix may be included in an amount of up to about 0.25 by weight, based on the total weight of the cereal formulation. The preferred range for the vitamin premix may be about 0.02% to about 0.15% by weight, based on the total weight of the cereal formulation. The amount of vitamin premix used can be altered to meet any level of vitamin concentration desired. Generally, the concentration provides a therapeutically effective amount of the vitamin premix in a 1 ounce serving unit.

An exemplary multi-vitamin premix that may be used in this invention includes one or more vitamins, such as vitamin E, biotin, vitamin A, vitamin D, niacin, vitamin $B_6$, vitamin $B_2$, folic acid and minerals, such as calcium, iron, zinc, copper, magnesium and phosphorous.

The cereal formulation preferably contains at least one flavoring component. Suitable flavorings include, for example, powdered cocoa, chocolate liquor, natural or artificial fruit flavors, spices such as cinnamon and/or nutmeg, honey flavoring, dry honey, almond flavoring, vanilla, maple flavoring and the like. The amount of flavoring added to the cereal formulation will vary depending on the type of flavoring and the desired intensity. Generally, the flavoring component will be included in amounts of up to 15% by weight, and preferably in amounts of about 1% to about 5% by weight. In a preferred form of the invention the cereal has a graham flavor provided by graham flour.

In a preferred form of the invention, a confectionery glazing solution is applied over the cereal pieces to provide a sweet taste and an appealing appearance. The glaze is generally a sugar solution which is heated to completely disperse the sugar. A suitable sugar may be, for example, "Set & Match" ® which includes about 85% by weight sucrose and about 15% by weight dextrose. The sugar is dissolved in water at about 180° F. and mixed to form a homogeneous cloudy mixture. The glaze is held at a temperature of about 155° F. to about 165° F. and applied to the baked and leavened cereal pieces. The glaze is preferably applied by spraying. The glaze is preferably applied as a coating comprising about 4% to about 5% by weight, based on the total weight of the baked cereal pieces. The coating and cereal pieces are then dried to a total moisture content of about 3% by weight.

In the process of the present invention, the ingredients are selected to produce a leavened, cookie-like product having an improved bowl life. The ingredients generally comprise at least one flour, sugar, fat or shortening, a dough conditioner, emulsifier, leavening and a flavoring. The flour, sugar, dough conditioner, emulsifier and fat or shortening are preferably creamed in a suitable mixing device, such as a Hobart mixer. The ingredients are blended for a sufficient period of time to form a uniform mixture. The mixing time may vary, depending on temperature conditions, mixing speed, and the proportions of the respective ingredients. Mixing is generally carried out at room temperature or slightly above room temperature. The mixing speed is preferably set at a low speed for about three minutes to about ten minutes. A uniform mixture is generally achieved in about five minutes.

After the flour, sugar and fat or shortening are blended, the liquid ingredients, such as liquid sweeteners, water, aqueous leavening systems, and flavors are mixed for about one to five minutes, generally about two minutes, to uniformly disperse the ingredients and form a homogeneous mixture. The remaining dry ingredients are then added and blended for about twenty minutes.

The homogeneous mixture is allowed to set for about thirty to about ninety minutes before shaping into pieces. The mixture may be shaped by extruding and cutting, sheeting and cutting by a rotary cutter, or preferably by rotary molding. The formulations in accordance with the present invention are particularly suitable for rotary molding and provide excellent definition and detail in the finished cereal piece.

The dough pieces are then baked in a suitable oven. In the preferred embodiment of the invention, the pieces are baked in a zoned band or continuous oven. The temperatures in the zones are set from about 230° F. to about 550° F. The actual oven temperature will depend on the type of oven used and the dough formulation. Total baking time will generally be about three minutes to about six minutes depending on the size, shape and composition of the cereal pieces.

In a preferred embodiment of the invention, the dough pieces are baked in a convection oven. The dough pieces may alternatively be baked in a continuous radio frequency oven or by microwave heating. Regardless of the type of oven employed, the baking step should be sufficient to completely bake and leaven the pieces and promote the formation of a substantially continuous film on the surface of the cereal piece from the bowl life extending film-forming starch.

The optional glaze is preferably sprayed onto the baked pieces as they exit the baking oven. The coated cereal pieces are then dried to about 3% to about 4% by weight moisture and packaged.

The following examples are intended to be exemplary of the invention and not intended to be limiting of the scope of the invention.

EXAMPLE 1

A honey and graham flavored cereal was prepared having crisp texture and an extended bowl-life from the following ingredients.

| Component | Percentage By Weight |
| --- | --- |
| Wheat Flour | 41.09 |
| Graham Flour | 17.61 |
| Granulated Sugar | 14.68 |
| Partially Hydrogenated Soybean Oil | 9.54 |
| Honey | 3.26 |
| Soda | 1.03 |
| Salt | 0.72 |
| Ammonium Bicarbonate | 0.15 |
| Lecithin | 0.15 |
| Water | 6.85 |
| Baka Snak ® (Pregelatinized waxy maize starch) | 2.20 |
| H.F.C.S. | 2.61 |
| Vitamin Premix | 0.11 |
| Total | 100.00 |

The granulated sugar, graham flour, soybean oil, and lecithin were mixed in a mixer at low speed for about five minutes. The soybean oil was melted before mixing by heating to about 130.F. The ingredients were blended to a uniform consistency and then the honey, high fructose corn syrup, ammonium bicarbonate and water were added. The ammonium bicarbonate was dissolved in a portion of the water before adding to the other ingredients. The ingredients were mixed for about two minutes to uniformly disperse the components. The wheat flour, salt, soda, and pregelatinized waxy maize starch were then added and mixed for about twenty minutes.

The dough was allowed to proof for about 30 to 90 minutes. The dough was then shaped by rotary molding to form dough pieces of about 25.0 grams. The rotary molded pieces had good definition and integrity. The pieces were then baked in a multi-zone continuous baking oven operating between 230° F. to 550° F. The pieces were baked for about 4 minutes, 20 seconds.

An aqueous glaze solution comprising about 60% sugar and 40% water was sprayed onto the hot baked cereal pieces at a temperature of about 170° F. The glaze was applied at a rate of about 4% to 5% by weight of the cereal pieces. The sugar component used to form the glaze was made up of about 89% sucrose and 11% maltodextrin. The moisture content of the coated cereal pieces was then reduced to about 2% to 3% by weight. The finished cereal had a glossy appearance and a crisp texture. The cereal was then stored in a closed container. After about one week, the cereal pieces exhibited bowl life of about 6 to 9 minutes when immersed in milk.

EXAMPLE 2

A honey and graham flavored cereal was prepared having crisp texture and an extended bowl-life from the following ingredients.

| Component | Percentage By Weight |
|---|---|
| Wheat Flour | 38.09 |
| Graham Flour | 17.61 |
| Granulated Sugar | 14.68 |
| Partially Hydrogenated Soybean Oil | 9.54 |
| Honey | 3.26 |
| Soda | 1.03 |
| Salt | 0.72 |
| Ammonium Bicarbonate | 0.15 |
| Lecithin | 0.15 |
| Water | 6.85 |
| Baka Snak ® (Pregelatinized waxy maize starch) | 3.50 |
| Emplex ® (Sodium Stearoyl Lactate) | 0.20 |
| Mira-Gel ® (cold water swelling starch) | 1.50 |
| H.F.C.S. | 2.61 |
| Vitamin Premix | 0.11 |
| Total | 100.00 |

The granulated sugar, graham flour, soybean oil, sodium stearoyl lactylate and lecithin were mixed in a mixer at low speed for about five minutes. The soybean oil was melted before mixing by heating to about 130° F. The ingredients were blended to a uniform consistency and then the honey, high fructose corn syrup, ammonium bicarbonate and water were added. The ammonium bicarbonate was dissolved in a portion of the water before adding to the other ingredients. The ingredients were mixed for about two minutes to uniformly disperse the components. The wheat flour, salt, soda, pregelatinized waxy maize starch and cold water swelling granular starch were then added and mixed for about twenty minutes.

The dough was allowed to proof for about 30 to 90 minutes. The dough was then shaped by rotary molding to form dough pieces of about 25.0 grams. The rotary molded pieces had good definition and integrity. The pieces were then baked in a multi-zone continuous baking oven operating between 230° F. to 550° F. The pieces were baked for about 4 minutes, 20 seconds.

An aqueous glaze solution comprising about 60% sugar and 40% water was sprayed onto the hot baked cereal pieces at a temperature of about 170° F. The glaze was applied at a rate of about 4% to 5% by weight of the cereal pieces. The sugar component used to form the glaze was made up of about 89% sucrose and 11% maltodextrose. The moisture content of the coated cereal pieces was then reduced to about 2% to 3% by weight. The finished cereal had a glossy appearance and a crisp texture. The cereal was place in a closed container. After about one week the cereal exhibited a bowl-life of about 21 to 24 minutes when immersed in milk. The outside of the cereal pieces began to soften with some early stages of disintegration after 24 minutes.

EXAMPLE 3

A cinnamon and graham flavored cereal was prepared from the following ingredients.

| Component | Percent By Weight |
|---|---|
| Wheat Flour | 40.97 |
| Graham Flour | 17.56 |
| Granulated Sugar (sucrose) | 14.63 |
| Partially Hydrogenated Soybean Oil | 9.51 |
| Soda | 1.02 |
| Salt | 0.45 |
| Ammonium Bicarbonate | 0.15 |
| EMPLEX ® (sodium stearoyl lactate) | 0.20 |
| Lecithin | 0.15 |
| Water | 6.65 |
| Baka Snak ® (Pregelatinized waxy maize starch) | 3.50 |
| MIRA-GEL 463 ® (cold water swelling granular starch) | 1.50 |
| H.F.C.S. | 2.60 |
| Vitamin Premix | 0.11 |
| Liquid Brown Sugar | 3.61 |
| Cinnamon | 0.25 |
| Cinnamon Flavor | 0.22 |
| Total | 100.00 |

The granulated sugar, graham flour, soybean oil, sodium stearoyl lactylate and lecithin were mixed at a low speed for about five minutes. The soybean oil was melted before mixing by heating to a temperature of about 130° F. The ingredients were blended to a uniform consistency and then the high fructose corn syrup, ammonium bicarbonate and water were added. The ammonium bicarbonate was dissolved in a portion of the water before adding to the other ingredients. The liquid brown sugar, cinnamon and cinnamon flavor were then added and uniformly mixed. The wheat flour, salt, soda, pregelatinized waxy maize starch and cold water swelling granular starch were added and mixed for about twenty minutes.

The dough was allowed to proof for about 30 to about 90 minutes. The dough was then shaped by rotary molding to form dough pieces of about 25.0 grams. The rotary molded pieces had good definition and integrity. The pieces were then baked in a multi-zone continuous baking oven operating between 230° F. to 550° F. The pieces were baked for about 4 minutes, 20 seconds.

An aqueous glaze solution comprising about 60% sugar and 40% water was sprayed onto the hot baked cereal pieces at a temperature of about 170° F. The glaze was applied at a rate of about 4% to 5% by weight of the cereal pieces. The sugar component used to form the glaze was made up of about 89% sucrose and 11% maltodextrin. The moisture content of the cereal pieces was then reduced to about 2% to 3% by weight. The finished cereal had a glossy appearance and a crisp texture. The cereal was then stored in a closed container. After about one week, the cereal pieces exhibited a bowl life of about 21 to 24 minutes when immersed in milk. The outside of the cereal pieces began to soften after about 24 minutes in milk.

EXAMPLE 4

A graham and chocolate-flavored cereal was prepared from the following ingredients.

| Component | Percent By Weight |
|---|---|
| Wheat Flour | 39.23 |
| Graham Flour | 10.67 |
| Granulated Sugar | 20.16 |
| Partially Hydrogenated Soybean Oil | 9.10 |
| Soda | 0.98 |
| Salt | 0.45 |
| Ammonium Bicarbonate | 0.14 |
| Lecithin | 0.14 |
| EMPLEX ® (sodium stearoyl lactate) | |
| Water | 10.19 |
| Baka Snak ® (Pregelatinized waxy maize starch) | 3.00 |
| MIRA-GEL ® 463 (cold water swelling granular starch) | 1.50 |
| H.F.C.S. | 1.38 |
| Vitamin Premix | 0.11 |
| Cocoa and Chocolate Liquor | 5.46 |
| Natural and Artificial Flavors | 0.51 |
| Total | 100.00 |

The granulated sugar, graham flour, soybean oil, sodium stearoyl lactylate, and lecithin were mixed at a low speed for about five minutes. The soybean oil was melted before mixing by heating to a temperature of about 130° F. The chocolate liquor was melted by heating to about 120° F. to 132° F. The melted chocolate liquor and the cocoa were added to the ingredients and uniformly mixed. The ingredients were blended to a uniform consistency and then the high fructose corn syrup, ammonium bicarbonate and water were added. The ammonium bicarbonate was dissolved in a portion of the water before adding to the other ingredients. The wheat flour, salt, soda, vitamin premix, pregelatinized waxy maize starch and cold water swelling granular starch and remaining dry ingredients were added and mixed for about twenty minutes.

The dough was allowed to proof for about 20 minutes. The dough was then shaped by rotary molding to form dough pieces of about 25.0 grams. The rotary-molded pieces had good definition and integrity. The pieces were then baked in a multi-zone continuous baking oven operating between 230° F. to 550° F. The pieces were baked for about 4 minutes, 20 seconds.

An aqueous glaze solution comprising about 60% sugar and 40% water was sprayed onto the hot baked cereal pieces at a temperature of about 170° F. The glaze was applied at a rate of about 4% to 5% by weight of the cereal pieces. The sugar component used to form the glaze was made up of about 89% sucrose and 11% maltodextrin. The moisture content of the coated cereal pieces was then reduced to about 2% to 3% by weight. The finished cereal had a glossy appearance and a crisp texture. The cereal was then stored in a closed container. After about one week, the cereal exhibited a bowl life of about 9 to 12 minutes when immersed in milk. The outside of the cereal pieces began to soften after about 12 minutes in milk.

What is claimed is:

1. A method of preparing a crisp ready-to-eat cereal having an extended bowl life, comprising the steps of:
    (a) forming a cookie dough from ingredients, including flour, sugar, fat or shortening, and a bowl life extender comprising a mixture of at least one film forming pregelatinized waxy starch or modified waxy starch and at least one cold water swelling granular starch having a cold water solubility of at least 50%;
    (b) forming the cookie dough into pieces; and
    (c) baking the pieces to form leavened cereal pieces, wherein the bowl life extender promotes the formation of a substantially continuous film on the surface of the pieces during baking thereof to form a substantially moistureresistant film and wherein the bowl life extender is included in an effective amount to inhibit sogginess of the baked cereal pieces in milk.

2. The method of claim 1 wherein the cookie dough includes graham flour in an amount sufficient to provide a graham flavor.

3. The method of claim 1 wherein the pregelatinized or modified waxy starch is from sorghum or rice.

4. The method of claim 1 wherein the pregelatinized waxy starch is a pregelatinized waxy maize starch.

5. The method of claim 1 wherein said cold water swelling granular starch having a cold water solubility of at least 50% is included in the amount of about 0.5% to about 5.0% by weight of the dough.

6. The method of claim 1 wherein the dough includes a dough conditioner.

7. The method of claim 6 wherein the dough conditioner is sodium stearoyl lactylate and is included in the amount of about 0.05% to about 0.25% by weight, based upon the weight of the dough.

8. The method of claim 1 wherein the dough further includes an emulsifying agent selected from the group consisting of lecithin, sorbitan mono stearate, monoglycerides, diglycerides and polyoxyethylene sorbitan fatty acid esters.

9. The method of claim 1 wherein the dough includes a mixture of lecithin and sodium stearoyl lactylate.

10. The method of claim 1 wherein the pregelatinized or modified waxy starch is included in the amount of about 0.75% by weight to about 10% by weight, based on the total weight of the cookie dough.

11. The method of claim 1 wherein the pregelatinized starch is present in the amount of about 1.25% by weight to about 5.0% by weight, based on the total weight of the cookie dough.

12. The method of claim 1 wherein the cookie dough includes about 30% to 50% wheat flour, about 10% to 25% graham flour, about 15% to 30% sugar, about 5% to 25% fat or shortening, about 0.7% to 10% of said pregelatinized waxy starch and about 0.5% to about 5.0% of a cold water swelling granular starch, wherein said percentages are by weight based on the total weight of the cookie dough.

13. The method of claim 1 wherein said cookie dough includes at least one chemical leavening agent and wherein the dough pieces are leavened by baking the pieces.

14. The method of claim 13 wherein the chemical leavening agent is selected from the group consisting of ammonium bicarbonate, sodium bicarbonate, tartaric acid, sodium phosphate and mixtures thereof.

15. The method of claim 1 wherein the flour is selected from the group consisting of wheat, rye, oat, corn, soya, rice, potato, tapioca and mixtures thereof.

16. The method of claim 1 wherein the flour is a mixture of wheat flour and graham flour.

17. The method of claim 1 wherein the cookie dough is shaped by rotary molding the dough to form pieces.

18. A leavened, baked ready-to-eat cereal prepared from a cookie dough comprising flour, sugar, shortening or fat, at least one leavening agent, and a bowl life extender comprising a mixture of at least one film-forming pregelatinized waxy starch or modified waxy starch and at least one cold water swelling granular starch present in an amount sufficient to extend the bowl life of the cereal, wherein said dough is shaped into pieces and baked to form a leavened cereal.

19. The cereal of claim 18 wherein the film-forming starch is from waxy maize, sorghum or rice.

20. The cereal from claim 18 wherein said bowl life extender comprises a mixture of a pregelatinized waxy maize starch and a cold water swelling granular starch having a cold water solubility of at least 50%.

21. The cereal of claim 18 including sodium stearoyl lactylate as a dough conditioner.

22. The cereal of claim 20 wherein said cold water swelling starch is included in the amount of about 0.5% to about 5.0% by weight of the dough.

23. The cereal of claim 20 wherein the cold water swelling starch is included in the amount of about 1.5% to about 2.0% by weight of the dough.

24. The cereal of claim 18 wherein said dough includes at least one emulsifier.

25. The cereal of claim 18 wherein said doug includes an emulsifier comprising lecithin and a dough conditioner comprising sodium stearoyl lactylate.

26. The cereal of claim 18 wherein the dough comprises about 10% to 25% graham flour.

27. The cereal of claim 18 wherein the bowl life extender waxy starch is included in an amount of about 0.75% by weight to about 10.0% by weight based upon the weight of the dough.

28. The cereal of claim 18 wherein the bowl life extender waxy starch is included in an amount of about 1.25% to about 5.0% by weight based upon the weight of the dough.

29. The cereal of claim 18 wherein the cookie dough includes about 30% to 50% wheat flour, about 10% to 25% graham flour, about 15% to about 30% sugar, about 1% to 2% leavening about 5% to 25% fat or shortening, and about 0.75% to about 10.0% of at least one pregelatinized waxy starch and about 0.5% to about 5.0% of at least one cold water swelling starch, wherein said percentages are by weight of the cookie dough.

30. The cereal of claim 18 wherein said leavening agent is selected from the group consisting of ammonium bicarbonate, sodium bicarbonate, sodium phosphate, and tartaric acid.

31. The cereal of claim 18 wherein the cookie dough is formed into pieces and baked in an oven at a temperature whereby said waxy starch forms a substantially continuous moisture-resistant barrier film on the surface of the cereal.

32. A method of controlling the bowl life of a ready-to-eat cereal in milk comprising the steps of:
  (a) preparing a dough by admixing flour sugar, at least one leavening agent, fat or shortening, water, and at least one bowl life extender comprising a mixture of at least one film-forming pregelatinized waxy starch or modified waxy starch and at least one cold water swelling granular starch having a cold water solubility of at least 50%;
  (b) forming the dough into pieces; and
  (c) baking the pieces at a temperature sufficient to form leavened cereal pieces and whereby said bowl life extender forms a substantially continuous moisture-inhibiting film on the surface of said cereal to inhibit moisture migration from the surroundings into the baked pieces.

33. The method of claim 32 wherein the leavening agent is selected from the group consisting of ammonium bicarbonate, sodium bicarbonate, sodium phosphate, tartaric acid and mixtures thereof.

34. The method of claim 32 wherein said bowl life extender is a mixture of a pregelatinized waxy maize starch and a cold water swelling granular starch having a cold water solubility of at least 50%.

35. The method of claim 32 wherein said dough includes a dough conditioner comprising sodium stearoyl lactylate.

36. The method of claim 35 wherein said dough further includes an emulsifier comprising lecithin.

37. The method of claim 35 wherein said sodium stearoyl lactylate is included in the amount of about 0.05% to about .25% by weight of the dough.

38. The method of claim 32 wherein said pregelatinized waxy starch is included in the amount of about 0.75% to about 10% by weight, based upon the weight of the dough.

39. The method of claim 32 wherein said cold water swelling starch is included in the amount of about 0.5% to about 5.0% by weight, based upon the weight of the dough.

* * * * *